July 2, 1963 C. B. VOGEL 3,096,502
DUAL RANGE ACOUSTICAL WELL LOGGING
Filed June 16, 1961
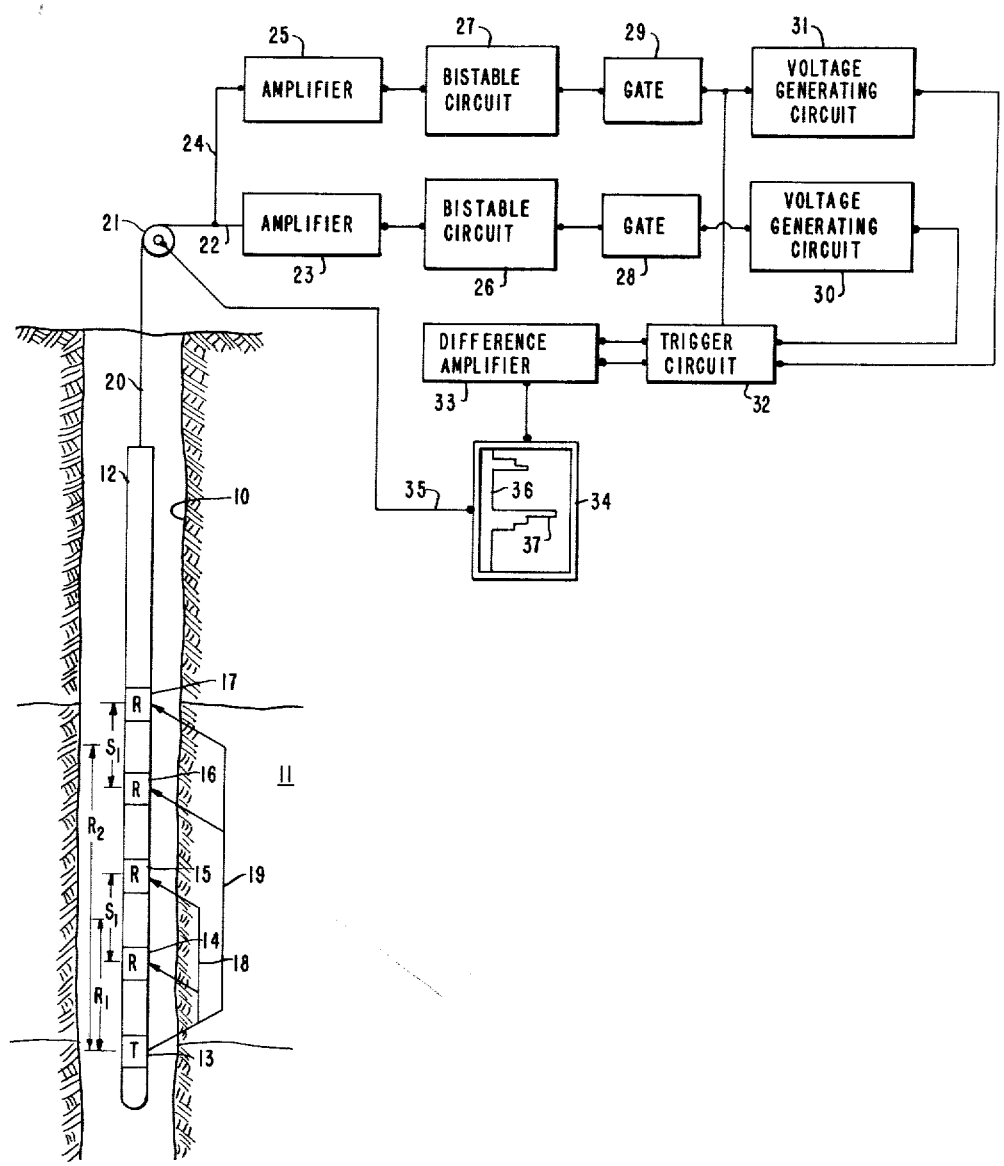
INVENTOR:
C. B. VOGEL
BY: Thomas E. Bibby
HIS ATTORNEY

United States Patent Office 3,096,502
Patented July 2, 1963

3,096,502
DUAL RANGE ACOUSTICAL WELL LOGGING
Charles B. Vogel, Houston, Tex., assignor to Shell Oil Company, New York, N.Y., a corporation of Delaware
Filed June 16, 1961, Ser. No. 117,594
5 Claims. (Cl. 340—18)

This invention relates to a well logging method and more specifically to a method for using acoustical well logging to locate radial velocity gradients in formations penetrated by a borehole and to classify sand and shale formations penetrated by a borehole.

At present acoustical logging equipment measures the velocity of sound through formations penetrated by the borehole in order to estimate the porosity of the formations. In normal practice these acoustical velocity logs are used in combination with other logs in order to distinguish sand and shale formations since the velocity of sound in sand and shale formations is substantially equal. While the combination of acoustical logs with other logs provides satisfactory results, a problem arises in many cases where it is difficult to determine by means of velocity logs the true velocity in a shale formation or even whether the velocities indicated are correct. This latter difficulty arises from the fact that there is often a gradient of velocity surrounding a borehole wall that changes rapidly with radial distance from the wall. When acoustical logging equipment is used to determine the velocity of a formation having an appreciable velocity gradient the indicated velocity of the acoustical impulses will depend partly upon the distance between the sound source and receivers. To reach a receiver placed a short distance from the source and first arriving impulse will have traveled only a short radial distance in the formation while to reach a receiver placed a greater distance from the source the first arrival will have traveled a greater radial distance in the formation in its propagation through the materials having the greatest acoustic velocity. Thus, the impulse in traveling from the source to the two receivers will travel through portions of the formation having different velocities and measured velocity of the formation will be in error.

It is the primary object of this invention to provide a novel method of acoustical logging utilizing at least two equal intervals with the two intervals being spaced at different ranges from the transmitter to accurately determine the acoustical velocities of formations having a radial velocity gradient.

A further object of this invention is to provide a novel method for minimizing the effect of a radial velocity gradient surrounding a formation penetrated by a borehole by determining the velocity over equal distances which are located at different distances from the transmitter.

Another object of the present invention is to provide a unique method by which velocity measurements may be used to identify the presence of sand and shale formations and to characterize the lithology of a formation penetrated by a borehole.

A still further object of this invention is to provide a novel method of acoustical logging utilizing at least four receivers to define two equal length intervals. One of the intervals is located at a short range from the transmitter while the other interval is located at a longer range from the transmitter.

A still further object of this invention is to provide a method of acoustical logging in which a transmitter and three receivers are used with the receivers being spaced to define two equal length intervals that are disposed at different ranges with respect to the transmitter.

This invention is based upon the discovery that wherever there is a radial velocity gradient of such sign that velocity increases as the distance from the borehole wall increases then the apparent velocity as measured between a pair of vertically spaced receivers will increase as the range of the interval defined by the receivers with respect to the transmitter is increased. Thus, if there is no radial velocity gradient the two values of velocity indicated by measurements utilizing four receivers defining two equal intervals with unequal ranges will be equal. On the other hand, if there is a positive velocity gradient then the interval with the greater range will produce indications of a higher velocity. It has been found that this phenomenon is more pronounced in shales than in sands and is more pronounced in shaley sands than in clean sands. Thus, this type of dual range logging is especially well suited to sections comprising sands and shales and is less useful for sections comprising carbonate rocks. By comparing the velocity indicated by intervals having long and with short ranges, it is possible to distinguish sands from shales in most cases and in some cases to estimate the degree of shaleiness of of a shaley sand. This information is of great importance when one attempts to estimate porosity by means of acoustical velocity measurements and is also useful in establishing the correlation between the strata encountered in different wells.

It is found in practice that the difference between velocity measurements made using an interval spacing of two feet and ranges of four feet and seven feet, respectively, the corresponding difference between indicated respective velocities will vary from one to ten percent approximately. In deeper sections this difference will generally amount to less than five percent of the indicated velocities. Since this a relatively small difference, it is, therefore, important that measurements with the long and short ranges respectively be made during a single traverse of the borehole. Otherwise the magnitude of the difference determined may be greatly in error because of possible drift which might occur in the calibration of the recording instruments between successive traverse of the borehole with the long and short range configurations respectively.

The above objects and advantages of this invention will be more easily understood by the following detailed description when taken in conjunction with the drawing showing a block diagram of an acoustical well logging system for performing the method of this invention.

Referring now to the drawing there is shown a borehole 10 which penetrates a formation 11. The formation 11 may be a sand or shale formation whose velocity is materially different than the formations on each side of it. An acoustical logging instrument 12 is lowered into the borehole by means of a cable 20. The logging instrument has a transmitting transducer 13 disposed at its lower end and four receiving transducers 14, 15, 16 and 17 disposed in a spaced relationship above the transmitter. The two receivers 14 and 15 are spaced at a distance $S_1$ with the receivers 16 and 17 spaced a similar distance $S_1$. As explained above a useful interval $S_1$ would be on the order of two feet. Effective center of the receivers 14 and 15 is spaced from the transmitter 13 a distance or range $R_1$ while the effective center of the receiver combination 16 and 17 is spaced a range $R_2$. The range $R_1$ may be four feet while the range $R_2$ may be seven feet, although other ranges may also be used. Thus, both receiver pairs determine the travel time of a sound impulse over equal distances $S_1$. While both receivers determine the velocity over the same distances the first pair 14 and 15 measure the velocity after the sound has traveled over a range $R_1$ while the second pair 16 and 17 measure the velocity after the sound has traveled over a range $R_2$. As represented in the drawing by the ray path 18 the sound reaching the first pair of receivers has penetrated only a slight radial distance into the formation surrounding the borehole, while in the case of the second pair of receivers the sound travels over a path represented by the ray path 19. In traveling the path represented by the ray path 19 the sound penetrates much more deeply into the formation. Any difference or gradient in the velocity in a radial direction will materially affect the velocity measured by the two pairs of receivers and appear as a difference in the measured velocities.

In certain formations, e.g., in a gas-filled formation which was disrupted by the drilling, the velocities measured along the two intervals may be affected by a gradient in which the velocity diminishes with distance away from the borehole. In such a formation high velocity first arriving waves that travel along the nearest interval may be attenuated before they reach the farthest interval so the detectors at the ends of the farthest interval are actuated by waves which are traveling at a lower velocity through formations farther from the borehole.

The logging instrument 12 is of well known construction and includes means for energizing the transmitter 13 to provide a train of acoustical impulses. The transmitter may be of various construction although a magnetostrictive type of transducer is preferred. The acoustical impulses are received by the receivers 14–17 after they have passed through the formation and converted to related electrical signals. Many well known devices are available for use as receivers although magnetostrictive devices are preferred. The receivers are coupled to transmitting circuits disposed in the logging instrument 12 but not shown in the attached drawing. The transmitting circuits are normally designed to transmit only a portion of the signal from the first receiver of each pair and the complete signal from the second receiver of each pair. By transmitting only a portion of the first receiver signal the possibility of the first receiver signal interfering with the second receiver signal is avoided. The power required by the logging instrument is supplied over a cable 20 that also includes circuits for transmitting the receiver signals to the surface. The cable 20 is also used to lower the instrument into the borehole and retrieve it.

The cable 20 passes over a measuring sheave 21 at the surface. The measuring sheave includes a selsyn type unit for driving a chart recorder 34. The cable 20 includes two circuits 22 and 24. The circuit 22 is utilized to couple the signals from the first pair of receivers 14 and 15 to the surface recording instruments while the circuit 24 couples the second pair of receivers 16 and 17 to the surface recording instruments. The circuit 22 is coupled to an amplifier 23 which in turn is coupled to a bistable circuit 26. Similarly, the circuit 24 is coupled to the circuit 25 which in turn is coupled to the bistable circuit 27. The bistable circuit 26 is coupled to gate 28 while the bistable circuit 27 is coupled to a similar gate 29. The two bistable circuits should be designed to open their associated gates when the acoustical impulse reaches the receivers 14 and 16, respectively, and close their associated gates when the pulses reach the far receivers 15 and 17. The gates 28 and 29 are coupled to voltage generating circuits 30 and 31 designed to generate a monotonically varying voltage whose final amplitude is related to the travel time of the impulses between the two receivers 14 and 15 or 16 and 17. To accomplish this, the gate circuits should initiate the generation of the voltage signal when they open and then terminate the generation when they close. In this manner the two voltage generating circuits will generate voltage signals whose final amplitude is related to the travel time of the acoustical impulse between the receivers 14 and 15 and 16 and 17, respectively. The final voltage of each voltage generating circuit can be stored in a capacitor or similar device in order that they may be used at a later time.

The gate 29 is also coupled to a trigger circuit 32 in a manner to open the trigger circuit when the gate 29 closes. The trigger circuit 32 is preferably a switching circuit having both stable and unstable operating conditions. With such a trigger circuit the gate 29 can switch it to its unstable state of operation to permit the two voltage generating circuits 30 and 31 to transmit their final voltage signals to a difference amplifier 33. After a predetermined time delay the trigger circuit 32 will then switch back to its initial or stable condition of operation. In this manner the difference amplifier 33 will detect any difference between the two voltage signals 30 and 31. This difference in the two voltage signals is then fed to a chart recording device 34 to position the recording instrument thereof. The recording instrument will then trace a recording on a record medium which is driven by the selsyn unit. Thus, the record of the difference in the two voltage signals will be related directly to the position of the logging instrument in the borehole 10.

When the above logging system is operating the surface recording system will provide a zero or base signal whenever the travel times of the acoustical impulse between the two pairs of receivers is substantially equal. This will occur whenever the formations have a substantially zero gradient of velocity in a radial direction. Under these circumstances the recording will appear on a base line 36. Since formations are encountered such as shale formations, which have a substantial velocity gradient in a radial direction a useable difference in the velocity as measured by the two pairs of receivers will be detected by the surface recording instrument and the record will contain a peak such as 37. Since the recording system will record whenever the transmitter 13 generates an acoustical impulse the actual record will have a series of steps instead of a smooth curve.

The recording system described above of course will record only the difference between velocities measured by the two pairs of receivers but the receiver signals could also be coupled to a normal recording system to record the actual velocity with respect to depth. The use of two recording systems would provide a normal velocity log and the gradient velocity log of this invention. From an inspection of both logs the presence of a sand or shale formation could be determined. Of course, only one pair of receivers should be coupled to the second recording system, either pair being acceptable.

From the above description, it is seen that a method has been provided by which one may detect the presence of a radial velocity gradient in formations penetrated by a borehole. By using two pairs of receivers spaced equal distances but located at different ranges from the transmitter there is obtained a measurement of the velocity of the sound impulses over equal distances. While the velocity of the impulses are measured over equal distances the impulses will travel varying distances in a radial direction in the formation to reach the various receivers. As explained above, sand and shale formations have a considerable change in velocity as one proceeds radially outwardly from the borehole. Accordingly, when a difference in the velocity of the sound impulse as measured by the two pairs of receivers is noted on the recording it will be an indication of the presence of a sand or shale formation. By correlating the results obtained from known formations one can also determine from the indicated velocities whether the formation noted is a shale or a sand formation.

While but a single embodiment of this invention has been described in detail many modifications may be made therein. The important feature of this invention is the use of a plurality of receivers in combination with the transmitter in order to measure the velocity of a sound impulse over two equal intervals located at different ranges from the transmitter. This may be accomplished by using either a single transmitter and four receivers as described above or by using a single transmitter and three receivers. Of course, various surface recording systems may be used in place of the one described above providing they record the difference in velocity as measured at the two ranges described above. Accordingly, this invention should not be limited to the details described but only to its broad spirit and scope.

I claim as my invention:

1. A method of acoustical well logging comprising: generating acoustical impulses at a point within a borehole; receiving said acoustical impulses over at least two separate equal length intervals, said equal length intervals being located at different ranges from said point and registering on a scale related to the depth of said point in the borehole a quantity whose magnitude is related to the difference in travel time of the acoustical impulse over said two separate equal length intervals.

2. A method of acoustically logging formations penetrated by a borehole comprising: generating an acoustical impulse at a point within a borehole; receiving said acoustical impulse at two spaced locations; receiving the same acoustical impulse at two additional locations spaced the same distance as said first mentioned locations, said additional locations being on the same side of said point as said first mentioned locations, and located at a greater range from said point than said first mentioned locations; and registering on a scale related to the depth of said point in the borehole a quantity whose magnitude is related to the difference in travel time of the acoustical impulse over the distance between said first mentioned locations and over the distance between said two additional locations.

3. A method of acoustically logging a formation penetrated by a borehole comprising: generating an acoustical impulse at a point in said borehole opposite the formation; receiving said impulse at a first pair of spaced receiving points, said first pair of receiving points being located to one side of the point at which said impulse is generated along the vertical axis of the borehole; receiving the same impulse at a second pair of spaced receiving points, said second pair of receiving points being spaced a distance equal to the spacing of the first pair of receiving points and located on said one side of the point at which said impulse is generated at a greater distance than the first pair of receiving points; transmitting signals indicating the arrival of said impulse at both said first pair of receiving points and said second pair of receiving points to the top of the borehole; and registering the difference between the time required for the impulse to travel the distance between the first pair of receiving points and the distance between the second pair of receiving points on a scale related to the depth of said point at which the impulse is generated within the borehole.

4. A method of acoustical well logging comprising: generating acoustical impulses at points within a borehole; generating signals indicating the duration of time periods required for said acoustical impulses to travel two equal intervals located at different fixed ranges from said points in the borehole; transmitting the generated signals to the surface and registering quantities whose magnitudes are related to the difference between the two time periods indicated by said signals.

5. A method of acoustically logging a formation penetrated by a borehole comprising: generating an acoustical impulse at a point in said borehole opposite the formation; receiving said impulse at a first pair of spaced receiving points, said first pair of receiving points being located to one side of the point at which said impulse is generated along the vertical axis of the borehole; receiving the same impulse at a second pair of spaced receiving points, said second pair of receiving points being spaced a distance equal to the spacing of the first pair of receiving points and located on said one side of the point at which said impulse is generated at a greater distance than the first pair of receiving points; transmitting signals indicating the arrival of said impulse at both said first pair of receiving points and said second pair of receiving points to the top of the borehole, converting the time difference between the arrival of said impulse at said first pair of receivers to a related voltage, converting the time difference between the arrival of said impulse at said second pair of receivers to a second related voltage and registering the difference between the two voltages on a scale related to the depth of said point at which the impulse is generated within the borehole.

No references cited.

Notice of Adverse Decision in Interference

In Interference No. 93,875 involving Patent No. 3,096,502, C. B. Vogel, DUAL RANGE ACOUSTICAL WELL LOGGING, final judgment adverse to the patentee was rendered Dec. 27, 1965, as to claims 1 and 4.
[*Official Gazette May 17, 1966.*]